United States Patent
Lee et al.

(10) Patent No.: US 12,514,814 B2
(45) Date of Patent: Jan. 6, 2026

(54) **COMPOSITION CONTAINING EXTRACT OF *LILIUM HANSONII* LEICHTLIN EX BAKER**

(71) Applicant: LG HOUSEHOLD & HEALTH CARE LTD., Seoul (KR)

(72) Inventors: So Young Lee, Seoul (KR); Young Je Ahn, Seoul (KR); Gil Nam Kim, Seoul (KR); Mu Hyun Jin, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 672 days.

(21) Appl. No.: 17/638,633

(22) PCT Filed: Aug. 28, 2020

(86) PCT No.: PCT/KR2020/011567
§ 371 (c)(1),
(2) Date: Feb. 25, 2022

(87) PCT Pub. No.: WO2021/040470
PCT Pub. Date: Mar. 4, 2021

(65) Prior Publication Data
US 2022/0296498 A1    Sep. 22, 2022

(30) Foreign Application Priority Data
Aug. 30, 2019   (KR) .................. 10-2019-0107147

(51) Int. Cl.
| | |
|---|---|
| *A61K 8/9794* | (2017.01) |
| *A23L 33/105* | (2016.01) |
| *A61K 9/00* | (2006.01) |
| *A61K 36/8967* | (2006.01) |
| *A61P 17/04* | (2006.01) |
| *A61Q 19/00* | (2006.01) |
| *A61Q 19/02* | (2006.01) |
| *A61Q 19/08* | (2006.01) |

(52) U.S. Cl.
CPC .......... *A61K 8/9794* (2017.08); *A23L 33/105* (2016.08); *A61K 9/0014* (2013.01); *A61K 36/8967* (2013.01); *A61P 17/04* (2018.01); *A61Q 19/007* (2013.01); *A61Q 19/02* (2013.01); *A61Q 19/08* (2013.01); *A23V 2002/00* (2013.01); *A61K 2236/33* (2013.01); *A61K 2236/55* (2013.01)

(58) Field of Classification Search
None
See application file for complete search history.

(56) References Cited

U.S. PATENT DOCUMENTS

2012/0156267 A1    6/2012   Mahmood

FOREIGN PATENT DOCUMENTS

| EP | 2 789 369 A1 | 10/2014 |
| JP | 2011-225564 A | 11/2011 |
| KR | 10-2012-0068707 A | 6/2012 |
| KR | 10-2018-0064146 A | 6/2018 |
| KR | 10-1972080 B1 * | 8/2019 |

OTHER PUBLICATIONS

Machine translation of Chang (KR 10-1972080, Description) (2024).*
Munafo, J.P., Jr. & Gianfagna, T.J., Chemistry and biological activity of steroidal glycosides from the *Lilium* genus, Nat. Prod. Rep., 2015, 32, 454 (Year: 2015).*
International Search Report for PCT/KR2020/011567 mailed on Dec. 11, 2020.
Yoon et al., "Hypopigmenting Effects of Extracts from Bulbs of Lilium Oriental Hybrid 'Siberia' in Murine B16/F10 Melanoma Cells", J Korean Soc Food Sci Nutr, 2014, vol. 43, No. 5, pp. 705-711.

* cited by examiner

*Primary Examiner* — H. Sarah Park
(74) *Attorney, Agent, or Firm* — Birch, Stewart, Kolasch & Birch, LLP

(57) ABSTRACT

An extract of *Lilium hansonii* Leichtlin ex Baker, according to the present invention, exhibits a whitening effect by inhibiting the expression of tyrosinases and reducing the total amount of melanin, reduces wrinkles and improves skin elasticity by promoting collagen synthesis of fibroblasts in the skin and inhibiting the activity of collagenases, exhibits an effect of anti-glycation that inhibits glycation, exhibits a skin moisturization effect by promoting the synthesis of hyaluronic acid, exhibits an effect of improving skin texture by reducing skin roughness, and exhibits effects of irritation relief and relief of stinging, itching, burning sensations and the like, thereby being usable in the preparation of cosmetic products, pharmaceuticals and foods.

4 Claims, 1 Drawing Sheet

COMPOSITION CONTAINING EXTRACT OF *LILIUM HANSONII* LEICHTLIN EX BAKER

TECHNICAL FIELD

The present invention relates to a composition including a *Lilium hansonii* extract.

BACKGROUND ART

It is a common desire of people to have fair skin. The color or brightness of the human skin is genetically determined by the concentration and distribution of melanin in the skin, but is also affected by environmental or physiological conditions, such as ultraviolet rays from the sun, fatigue, or stress. Melanin is produced when tyrosine, which is a type of amino acid, is changed to DOPA and then to dopaquinone due to a catalytic action of an enzyme called tyrosinase and then undergoes a non-enzymatic oxidation reaction. As such, the pathway for melanin production is known, but the cause of tyrosinase triggering in the mechanism leading to melanin synthesis is not yet fully elucidated.

Meanwhile, commonly known whitening ingredients include materials that inhibit tyrosinase enzyme activity, such as Kojic acid or arbutin, hydroquinone, vitamin C (L-ascorbic acid), derivatives thereof, and various plant extracts. These ingredients can realize skin whitening by brightening the skin tone by inhibiting the synthesis of melanin pigment, and can improve skin hyperpigmentation such as spots or freckles caused by ultraviolet rays, hormones, or heredity. However, when these ingredients are applied to the skin, a usable amount thereof is limited due to safety issues such as irritation and redness, or the effect thereof is so insignificant that it cannot be expected that the ingredients will actually be effective.

In addition, collagen is a major matrix protein produced by fibroblasts of the skin and is present in the extracellular matrix, and importantly, it is known to be responsible for the mechanical firmness of the skin, the resistance of connective tissues and the binding strength of tissues, the maintenance of cell adhesion, the induction of cell division and differentiation (during the growth of organisms or during wound healing), and the like. Such collagen decreases due to aging and photoaging caused by ultraviolet irradiation, and it is known that the decrease in collagen is closely related to the formation of wrinkles in the skin. In addition, in recent years, extensive research on skin aging is revealing important functions of collagen in the skin.

Active ingredients that improve wrinkles by promoting collagen synthesis are known. Examples of these materials known to promote collagen synthesis include retinoic acid, transforming growth factors (TGFs), animal placenta-derived proteins, betulinic acid, and chlorella extracts. However, when the active ingredients are applied to the skin, a usable amount thereof is limited due to safety issues such as irritation and redness, or the effect thereof is so insignificant that it cannot be expected that the ingredients will actually have an effect of improving skin function by promoting collagen synthesis in the skin.

Glycation generally refers to a reaction in which a simple sugar such as glucose or fructose forms a covalent bond with a protein or fat without the involvement of an enzyme. The accumulation of final glycation products changes the protein into a harder and more brittle state, and the glycation of collagen prevents collagen from forming an appropriate structure in the extracellular matrix of the dermal layer and thereby causes the skin to lose elasticity and promotes wrinkle formation. In addition, the final glycation product produced by glycation is a brownish material and is determined to be a material causing a phenomenon in which the color of the face gradually turns yellow as skin aging progresses. It is known that as certain final glycation products accumulate, the amount of light reflected from the skin decreases. Materials known to inhibit glycation include aminoguanidine, pyridoxamine, aspirin, and the like, but these materials have problems in that a usable amount thereof is limited due to safety issues such as irritation and redness, or the effect thereof is so insignificant that it cannot be expected that the materials will actually be effective.

The skin has three layers: the epidermis, the dermis, and subcutaneous fat. Among these, the dermis, which is located beneath the epidermis, plays the most important role in terms of skin aging and thus has been intensively studied in the field of skin care. Fiber components that play an important role in maintaining the structure of the dermis include cytokeratin, integrin, laminin, collagen, and the like. These fiber components are basically responsible for forming the skeleton of the dermis and maintaining healthy skin. Among these, cytokeratin, integrin, and laminin are present at the dermis-epidermal junction where the epidermis and the dermis are connected, and play a role in regulating the binding strength between the epidermis and the dermis, and collagen is present inside the entire dermis and is known to play a role in maintaining the structure of the entire skin and controlling elasticity. In particular, in the case of collagen, it is known that when it does not have a normal structure, it is significantly weaker than the normal type in terms of strength or elasticity and thus is not helpful in maintaining the structure of the dermis.

Accordingly, many studies have been conducted to improve skin texture by promoting the synthesis of each fiber component and analyze effects thereof on the skin.

However, although it has been confirmed that the conventional cosmetic compositions increase the synthesis amount of each fiber component, it has not been studied whether the cosmetic compositions actually improve skin texture. Therefore, it is necessary to develop a material that can improve skin texture without skin irritation.

In addition, there is an urgent need to develop a material that is safe for the human body, stably contains active ingredients, and above all, has an activity superior to that of conventional materials effective for skin whitening, wrinkle improvement, elasticity enhancement, skin soothing, antiglycation and/or skin texture improvement.

DISCLOSURE

Technical Problem

The present invention is directed to providing a cosmetic composition for skin whitening, wrinkle improvement, elasticity enhancement, skin soothing, antiglycation, skin moisturization, or skin texture improvement, which includes a *Lilium hansonii* extract as an active ingredient.

In addition, the present invention is directed to providing an external preparation for skin whitening, wrinkle improvement, elasticity enhancement, skin soothing, antiglycation, skin moisturization, or skin texture improvement, which includes a *Lilium hansonii* extract as an active ingredient.

In addition, the present invention is directed to providing a pharmaceutical composition for skin whitening, wrinkle improvement, elasticity enhancement, skin soothing, antiglycation, skin moisturization, or skin texture improvement, which includes a *Lilium hansonii* extract as an active ingredient.

In addition, the present invention is directed to providing a food composition for skin whitening, wrinkle improvement, elasticity enhancement, skin soothing, antiglycation, skin moisturization, or skin texture improvement, which includes a *Lilium hansonii* extract as an active ingredient.

In addition, the present invention is directed to providing a method of achieving skin whitening, wrinkle improvement, elasticity enhancement, skin soothing, antiglycation, skin moisturization, or skin texture improvement, which includes a step of applying the above-described *Lilium hansonii* extract to the skin.

In addition, the present invention is directed to providing a use of a *Lilium hansonii* extract for preparing a cosmetic composition for skin whitening, wrinkle improvement, elasticity enhancement, skin soothing, antiglycation, skin moisturization, or skin texture improvement.

All of the above and other objectives of the present invention can be solved by the present invention described below in detail.

Technical Solution

The present inventors have confirmed that a *Lilium hansonii* extract has a whitening effect by reducing the total amount of melanin, promotes collagen synthesis by fibroblasts in the skin, improves wrinkles by inhibiting collagenase activity, enhances elasticity, has a skin soothing effect, inhibits glycation by having an antiglycation effect, has a skin moisturizing effect by promoting hyaluronic acid synthesis, and has a skin texture improvement effect by improving skin roughness, and thereby completed the present invention.

Therefore, the present invention relates to a use of a *Lilium hansonii* extract for skin whitening, wrinkle improvement, elasticity enhancement, skin soothing, antiglycation, skin moisturization, and skin texture improvement.

Hereinafter, the configuration of the present invention will be described in detail.

One aspect of the present invention provides a composition for skin whitening, wrinkle improvement, elasticity enhancement, skin soothing, antiglycation, skin moisturization, or skin texture improvement, which includes a *Lilium hansonii* extract as an active ingredient.

In the present invention, "*Lilium hansonii*" is a perennial plant also called Hanson's lily or Ulleungdo turk's-cap lily and belonging to the order Liliales and family Liliaceae, and it is known to be distributed in Ulleungdo and the northeastern region of South Korea.

In the present invention, the type of *Lilium hansonii* is not limited, and a cultivated plant or a commercially available plant may be used. In addition, the *Lilium hansonii* extract may be obtained using any part of *Lilium hansonii*, and the part from which the extraction is extracted is not limited. The preparation of the *Lilium hansonii* extract is not limited by the form of the plant, and the plant is meant to include all of those that have been processed through a drying process and the like. For example, the *Lilium hansonii* of the present invention may be a whole plant of *Lilium hansonii*, a root of *Lilium hansonii*, a stem of *Lilium hansonii*, a leaf of *Lilium hansonii*, and a flower of *Lilium hansonii*, and is preferably a whole plant, root, or flower of *Lilium hansonii*.

In the present invention, "extract" includes an extract itself and all types of formulations obtainable using an extract, such as an extract obtained by an extraction treatment, a diluted or concentrated liquid of the extract, a dried product obtained by drying the extract, a partially purified product or purified product of the extract, or a combination thereof. The *Lilium hansonii* extract of the present invention may be extracted from a natural, hybrid, or mutated plant of *Lilium hansonii* and can also be extracted from a plant tissue culture.

In the extraction of the present invention, an extraction method is not particularly limited, and the extraction may be performed by a method commonly used in the art. Non-limiting examples of the extraction method include a solvent extraction method, a hot-water extraction method, an ultrasonic extraction method, a filtration method, and a reflux extraction method, and one, or a combination of two or more thereof may be performed.

In the present invention, the drying of an extract may be performed by a known method to the extent of not destroying useful ingredients collected from plants, and for example, it may be performed by naturally drying the extract in the shade. In addition, the plant only needs to be crushed to such an extent that its useful ingredients can be sufficiently extracted in a subsequent extraction process, and the resultant may be pulverized into a powder. The drying and crushing processes may be performed in reverse order or may be repeatedly performed as necessary.

In the present invention, the type of extraction solvent used for extracting *Lilium hansonii* is not particularly limited, and any solvent known in the art may be used. In the present invention, the extract may be obtained by extraction with water, a lower alcohol having 1 to 6 carbon atoms, or a mixed solvent thereof. In addition, non-limiting examples of the extraction solvent include: water; a lower alcohol having 1 to 6 carbon atoms, such as methanol, ethanol, propyl alcohol, or butyl alcohol; a polyhydric alcohol such as glycerin, butylene glycol, or propylene glycol; a hydrocarbon-based solvent such as methyl acetate, ethyl acetate, acetone, benzene, hexane, diethyl ether, or dichloromethane; or a combination thereof, and specifically, one of water, a lower alcohol, 1,3-butylene glycol, and ethyl acetate may be used, or a combination of two or more thereof may be used. In this case, when a combination of two or more types of solvents is used, the mixing ratio of the solvents is not particularly limited.

In the present invention, as the solvent for extracting *Lilium hansonii*, more specifically, ethanol, ethyl acetate, water, dichloromethane, butanol, hexane, or the like may be used. A *Lilium hansonii* extract extracted using the solvent may be distilled under reduced pressure and then freeze-dried or spray-dried to prepare a dry extract. In one exemplary embodiment described below, a *Lilium hansonii* extract was prepared using a mixed solvent of water and ethanol as an extraction solvent, and was used after filtration and concentration under reduced pressure.

The extraction may be performed by a method of extracting at an extraction temperature of 10 to 80° C., specifically, 15 to 50° C., for an extraction time of 2 hours to 30 days, specifically, 12 hours to 18 days, using a solvent having the weight of 1 to 30 times, specifically, 2 to 10 times, the weight of the above-described *Lilium hansonii* dried product, and may include a step of obtaining a liquid crude extract, including the dried/crushed product, by extracting once or continuously extracting five or more times.

In the present invention, the extract may be filtered using, for example, nylon or filter paper, or a method such as a cryofiltration method to remove floating particles by filtering out the particles. Subsequently, the filtered extract may be used as is or used after drying by freeze-drying, hot-air drying, spray drying, or the like.

The liquid crude extract may be concentrated or dried after being separated from the dried/crushed plant product by a process such as filtration under reduced pressure. For example, the liquid crude extract may be concentrated under reduced pressure at a temperature of 20 to 100° C. and preferably 30 to 70° C. using a vacuum rotary concentrator, or the liquid extract may be dried to obtain a powdered extract. This concentrated or powdered extract may be used by dissolving in water, alcohol, dimethyl sulfoxide (DMSO), or a mixed solvent thereof as necessary.

In the present invention, the active ingredient may be a fraction of a *Lilium hansonii* extract.

As used in the present invention, the term "fraction" refers to a resultant obtained by performing fractionation in order to separate a specific component or a specific group of components from a mixture including several different components.

In the present invention, a fractionation method for obtaining the above-described fraction is not particularly limited and may be performed according to a method commonly used in the art. Non-limiting examples of the fractionation method include a method of obtaining the fraction from a *Lilium hansonii* extract, which was obtained by extracting *Lilium hansonii*, by treating the extract with a predetermined solvent.

In the present invention, the type of solvent used for obtaining the fraction is not particularly limited, and any solvent known in the art may be used. Non-limiting examples of the fractionation solvent include: polar solvents such as water and alcohol; and non-polar solvents such as hexane, ethyl acetate, chloroform, dichloromethane, and butanol. One, or a combination of two or more of the solvents may be used. When using alcohol as the fractionation solvent, an alcohol having 1 to 6 carbon atoms may be used.

In the present invention, "skin whitening effect" refers to not only brightening skin tone by inhibiting the synthesis of melanin pigment but also improving skin hyperpigmentation such as spots or freckles caused by ultraviolet rays, hormones, or heredity.

In the present invention, "wrinkle improvement effect" refers to inhibiting or preventing wrinkle formation in the skin or alleviating the already formed wrinkles.

In the present invention, "elasticity enhancement effect" refers to increasing the elasticity of the skin by inhibiting or preventing the loss of skin elasticity or alleviating the already reduced elasticity.

In the present invention, "skin soothing effect" refers to alleviating or improving symptoms of skin irritation caused by an external irritant by alleviating skin symptoms caused by the external irritant or restoring the skin having troubles due to the skin symptoms to its original state. The skin irritation means having symptoms such as erythema, itchiness, stinging, or hotness on the skin as caused by an external irritant and may be caused by skin photosensitivity, allergies, or the like.

More specifically, the skin soothing effect may mean alleviating skin symptoms caused by an external irritant or skin troubles caused due to the skin symptoms.

In the present invention, "antiglycation effect" refers to preventing or inhibiting the glycation phenomenon in which glucose present in cells reacts with proteins to reduce protein functions in the body. In-vivo glycation forms a Schiff-base, which is an initial glycation product, through a non-enzymatic reaction between an amino group of a protein in the skin and tissue and a reducing sugar, and the Schiff-base is rearranged to form a more stable Amadori product. Subsequently, when the Amadori product is exposed to reactive oxygen species over time, it undergoes various steps such as cleavage, cross-linking, aggregation, and carbonyl group formation steps to form an advanced glycation end product (AGE). The formed AGE-protein bonds are very stable and irreversible, so these bonds continue to increase with age, causing the skin to appear dull and lose its elasticity.

Furthermore, when the AGE continues to accumulate, various skin troubles may occur. When skin troubles occur due to the accumulation of AGEs, due to the progress of glycation, the skin may appear dull and yellow, may become stiff and not soft, and may partially develop spots due to the deposition of AGEs. In this aspect, the antiglycation effect of the present invention may include inhibiting or preventing skin troubles caused by the progress of glycation and the accumulation of AGEs, and may even include improving skin tone and improving skin texture.

In the present invention, "skin moisturizing effect" refers to preventing or inhibiting a decrease in moisture in the skin or increasing a moisture content of the skin, thereby smoothing the skin surface and imparting gloss to the skin.

In the present invention, "skin texture improvement effect" refers to inhibiting or preventing the roughening of the skin due to aging, stress, or the like, thereby smoothing the skin surface, imparting gloss, and improving and brightening skin tone.

Meanwhile, as used herein, the term "including as an active ingredient" refers to including a sufficient amount of *Lilium hansonii* extract for achieving the above-described skin whitening activity, wrinkle improvement activity, elasticity enhancing activity, skin soothing activity, antiglycation activity, skin moisturizing activity, or skin texture improvement activity.

Therefore, one aspect of the present invention provides a cosmetic composition for skin whitening, wrinkle improvement, elasticity enhancement, skin soothing, antiglycation, skin moisturization, or skin texture improvement, which includes the above-described *Lilium hansonii* extract as an active ingredient.

When the composition is used as a cosmetic composition, it may be prepared in the form of a general emulsified formulation or solubilized formulation. For example, the composition may be a formulation such as: a toner such as a softening toner or a nourishing toner, an emulsion such as a facial lotion or a body lotion; a cream such as a nourishing cream, moisturizing cream, or eye cream; an essence; a makeup ointment; a spray; a gel; a mask pack; a sunscreen; a makeup base; a foundation such as a liquid-type foundation, solid-type foundation, or spray-type foundation; a powder; a makeup remover such as a cleansing cream, cleansing lotion, or cleansing oil; or a cleanser such as a cleansing foam, soap, or body wash.

In addition, additives commonly used in the cosmetic field, such as a fatty substance, an organic solvent, a solubilizer, a thickener, a gelling agent, an emollient, an antioxidant, a suspending agent, a stabilizer, a foaming agent, a fragrance, a surfactant, water, an ionic emulsifier, a non-ionic emulsifier, a filler, a sequestering agent, a chelating agent, a preservative, vitamin, a blocker, a humectant, an essential oil, a dye, a pigment, a hydrophilic active agent, a lipophilic active agent, or lipid vesicles, may be additionally added to the *Lilium hansonii* extract. The additives may include natural additives and/or synthetic additives.

The natural additive refers to an ingredient such as an organic raw material, a plant and a plant-derived raw material, an animal and an animal-derived raw material, a mineral and a mineral-derived raw material, and water. For example, the natural additive may be one or more additives selected from the group consisting of a moisturizer, an ultraviolet blocker, a neutralizer, a fragrance, a preservative, an antioxidant, a thickener, a viscosity modifier, a film former, and a pigment.

In the present invention, the natural additive has a meaning that includes an ingredient obtained from a natural product, an ingredient obtained by simply modifying an ingredient derived from a natural product, or an ingredient synthesized from a naturally derived ingredient and excludes a synthetic ingredient synthesized by an artificial method rather than naturally derived.

The natural additive may refer to, for example, a cosmetic raw material that satisfies organic standards and eco-friendly certification grades set by the country or natural grades equivalent thereto.

The eco-friendly certification standards certify compositions formed of ingredients grown and processed in an eco-friendly manner that excludes synthesis processes. Representative eco-friendly certifications include those issued by the ECOCERT of France, COSMOS of Europe, the US Department of Agriculture (USDA) of the U.S., the Association of German Industries and Trading Firms (BDIH) of Germany, the Japanese Agricultural Standard (JAS) of Japan, and the like, and in response to the recent consumer preference for eco-friendly products, each country has developed various eco-friendly certification systems to certify the safety of ingredients or products. Although details such as FIGURES and ranges may be slightly different by country, categories of primary components, such as raw materials and ingredients, for which the eco-friendly certifications are granted are globally the same in a broad sense. Naturally derived ingredients belong to the eco-friendly organic ingredient category, and other semi-processed ingredients are classified into Physically Processed Agro Ingredients (PPAIs) and Chemically Processed Agro Ingredients (CPAIs), and only raw materials that meet these standards are certified by the ECOCERT, COSMOS, USDA, or the like.

In the present invention, raw materials and ingredients certified by the country as being organic and eco-friendly refer to cosmetic raw materials and compositions which are formed only of components satisfying or possibly satisfying organic standards and eco-friendly certification standards set by the country and thus are capable of satisfying the organic and eco-friendly standards set by the country.

For example, the raw materials and ingredients certified by the country as being organic and eco-friendly refer to those formed only of components satisfying or possibly satisfying the standards set by the Chinese government or the organic and eco-friendly certification standards recognized in China.

In the present invention, the synthetic additive refers to a raw material that was chemically synthesized rather than naturally derived.

Each of the above-described components included in a cosmetic composition of the present invention is preferably included in the cosmetic composition of the present invention within a range not exceeding the maximum usage amount stipulated in the "Cosmetics Safety and Technical Specifications" set by the Chinese government.

When the *Lilium hansonii* extract is commercialized as a cosmetic product, in the case of a wash-off type cosmetic such as a makeup remover or a cleanser, the active ingredients of which stay on the skin for a short period of time, the *Lilium hansonii* extract may be included at a relatively high concentration. On the other hand, in the case of a leave-on type cosmetic such as a lotion, emulsion, cream, or essence, the active ingredients of which stay on the skin for a long period of time, the *Lilium hansonii* extract may be included at a lower concentration than in the case of the wash-off type cosmetics. Although not limited thereto, according to one exemplary embodiment of the present invention, the composition may include the *Lilium hansonii* extract in an amount of 0.0001 parts by weight to 10 parts by weight (preferably, 0.0001 parts by weight to 5 parts by weight) based on the total weight of the composition. When the composition of the present invention includes the *Lilium hansonii* extract in an amount of less than 0.0001 parts by weight, a sufficient skin whitening effect, an wrinkle improvement effect, an elasticity enhancement effect, a skin soothing effect, an antiglycation effect, a skin moisturizing effect, or a skin texture improvement effect cannot be expected, and when the *Lilium hansonii* extract is included in an amount of more than 10 parts by weight, unwanted reactions such as allergic reactions may occur or there may be a skin safety problem, which should be prevented.

Another aspect of the present invention provides an external preparation for skin whitening, wrinkle improvement, elasticity enhancement, skin soothing, antiglycation, skin moisturization, or skin texture improvement, which includes the *Lilium hansonii* extract as an active ingredient.

When the *Lilium hansonii* extract is used as an external preparation for the skin, it may additionally include auxiliary agents used in the field of dermatology, such as any miscellaneous ingredients commonly used in external preparations for the skin, for example, a fatty substance, an organic solvent, a solubilizer, a thickener and a gelling agent, an emollient, an antioxidant, a suspending agent, a stabilizer, a foaming agent, a fragrance, a surfactant, water, an ionic emulsifier, a non-ionic emulsifier, a filler, a sequestering agent, a chelating agent, a preservative, a vitamin, a blocker, a humectant, an essential oil, a dye, a pigment, a hydrophilic active agent, a lipophilic active agent, or lipid vesicles. In addition, the above components may be added in an amount generally used in the field of dermatology.

When the *Lilium hansonii* extract is used as a skin external preparation, it may be a formulation such as an ointment, patch, gel, cream, or spray, but the present invention is not limited thereto.

Still another aspect of the present invention provides a pharmaceutical composition for skin whitening, wrinkle improvement, elasticity enhancement, skin soothing, antiglycation, skin moisturization, or skin texture improvement, which includes the *Lilium hansonii* extract as an active ingredient.

The pharmaceutical composition may be in the form of a solution, suspension, or emulsion in an oil or aqueous medium or may be in the form of an extract, a powder, granules, tablets, or capsules.

In addition, the composition may additionally include one or more active ingredients having the same or similar functions. For example, known ingredients capable of achieving skin whitening, wrinkle improvement, elasticity enhancement, skin soothing, antiglycation, skin moisturization, and skin texture improvement may be included. When the additional ingredients capable of achieving skin whitening, wrinkle improvement, elasticity enhancement, skin soothing, antiglycation, skin moisturization, and skin texture improvement are included, the skin whitening, wrinkle improvement, elasticity enhancement, skin soothing, antiglycation, skin moisturization, and skin texture improvement effects of the composition of the present invention can be further enhanced. When adding the above-described ingredients, skin safety in the case of combined use, the ease of formulation, and the stability of active ingredients may be considered. According to one exemplary embodiment of the present invention, the composition may additionally include one or more skin whitening components known in the art selected from the group consisting of materials inhibiting tyrosinase enzyme activity, such as Kojic acid and arbutin, hydroquinone, vitamin-C, derivatives thereof, and various plant extracts.

The additional component may be included in an amount of 0.0001 parts by weight to 10 parts by weight based on the total weight of the composition, and a content range thereof may be adjusted according to requirements such as skin safety and the ease of formulation of the *Lilium hansonii* extract.

In addition, the composition of the present invention may additionally include a pharmaceutically acceptable carrier.

The pharmaceutically acceptable carrier may include various ingredients such as a buffer, sterile water for injection, plain saline or phosphate buffered saline, sucrose, histidine, salts, and polysorbates.

The composition of the present invention may be administered orally or parenterally, and may be administered in the form of a general pharmaceutical formulation, for example, various oral and parenteral formulations for clinical administration. When formulated, the composition may be prepared using a commonly diluent or excipient such as a filler, an extender, a binder, a wetting agent, a disintegrant, or a surfactant.

Solid preparations for oral administration include tablets, pills, powders, granules, capsules, and the like, and these solid preparations may be formulated by adding one or more excipients such as starch, calcium carbonate, sucrose, lactose, or gelatin to the pharmaceutical composition of the present invention.

In addition to a simple excipient, lubricants such as magnesium stearate and talc are also used. Liquid formulations for oral use include suspensions, solutions for internal use, emulsions, syrups, and the like, and may include, in addition to water or liquid paraffin, which are commonly used simple diluents, various excipients such as a wetting agent, a sweetener, a fragrance, and a preservative.

Formulations for parenteral administration include sterile aqueous solutions, non-aqueous solutions, suspensions, emulsions, freeze-dried preparations, and suppositories. As a non-aqueous solvent or a suspending medium, propylene glycol, polyethylene glycol, a vegetable oil such as olive oil, and an injectable ester such as ethyl oleate may be used. As a base of a suppository, Witepsol, macrogol, Tween 61, cacao butter, sevum laurinum, glycerogelatin, and the like may be used.

In the present invention, the term "effective amount" refers to an amount of the extract capable of whitening skin, improving wrinkles, enhancing elasticity, soothing skin irritation, inhibiting glycation, moisturizing the skin, or improving skin texture. When including an effective amount of the *Lilium hansonii* extract, the composition of the present invention can provide a desirable skin whitening effect, wrinkle improvement effect, elasticity enhancement effect, skin soothing effect, antiglycation effect, skin moisturizing effect, and skin texture improvement effect. The effective amount of the *Lilium hansonii* extract included in the composition of the present invention may vary depending on the form in which the composition is commercialized, how the compound is applied to the skin, how long it stays on the skin, and the like. For example, when the composition is commercialized as a pharmaceutical formulation, it may contain the *Lilium hansonii* extract at a higher concentration than when it is commercialized as a cosmetic that is applied to the skin on a daily basis. Therefore, a daily dose is in the range of 0.1 to 100 mg/kg, preferably 30 to 80 mg/kg, and more preferably 50 to 60 mg/kg based on the amount of the *Lilium hansonii* extract, and administration may be performed one to six times a day.

The composition of the present invention may be used alone or may be used in combination with methods using surgery, radiation therapy, hormone therapy, chemotherapy, and biological response modifiers.

Yet another aspect of the present invention provides a quasi-drug for skin whitening, wrinkle improvement, elasticity enhancement, skin soothing, antiglycation, skin moisturization, or skin texture improvement, which includes the *Lilium hansonii* extract as an active ingredient.

In the present invention, "quasi-drug" may include a pharmaceutically acceptable carrier, excipient, or diluent as necessary, in addition to including the *Lilium hansonii* extract as an active ingredient. The pharmaceutically acceptable carrier, excipient, or diluent is not limited as long as it does not impair the effects of the present invention, and may include, for example, a filler, an extender, a binder, a wetting agent, a disintegrant, a surfactant, a lubricant, a sweetener, a flavoring agent, or a preservative, but the present invention is not limited thereto.

The quasi-drug may be, for example, a disinfectant cleaner, a shower foam, a liquid ointment, a wet tissue, or a coating, and is preferably prepared as a semi-solid preparation such as an external ointment or a lotion, but the present invention is not limited thereto. The formulation method of the quasi-drug, dosage, a usage method, components, and the like may be appropriately selected from conventional techniques known in the art.

Yet another aspect of the present invention provides a food composition for skin whitening, wrinkle improvement, elasticity enhancement, skin soothing, antiglycation, skin moisturization, or skin texture improvement, which includes the *Lilium hansonii* extract as an active ingredient.

The food formulation refers to a food prepared by adding the *Lilium hansonii* extract to food materials such as beverages, teas, spices, gums, and confectioneries, or by manufacturing the same in capsules, powders, suspensions, or the like.

The food formulation is very useful, since it can be consumed on a daily basis and thus high skin whitening, wrinkle improvement, elasticity enhancement, skin soothing, antiglycation, skin moisturization, and skin texture improvement effects can be expected.

When the *Lilium hansonii* extract is used as a food additive, the *Lilium hansonii* extract may be added as is or used together with other foods or food ingredients, and may be appropriately used according to a conventional method.

The addition amount of the active ingredient may be appropriately determined according to the purpose of use (prevention, health care, or therapeutic treatment).

In general, when producing food or beverages, the composition of the present invention is added in an amount of 15 parts by weight or less and preferably 10 parts by weight or less based on the raw material. However, when it is intended for intake for health care and hygiene or long-term intake for health promotion, the composition may be used in an amount less than the above range, and since it does not have any safety risk, the active ingredient may also be used in an amount exceeding the above range.

There is no particular limitation on the type of food. Examples of the food to which the above-described material can be added include meats, sausages, breads, chocolates, candies, snacks, confectionaries, pizzas, ramen noodles, other noodles, gums, dairy products such as ice cream, various soups, beverages, teas, drinks, alcoholic beverages, and vitamin complexes, and includes all health functional foods in the ordinary sense.

When the food formulation is a beverage, it may contain various flavoring agents, natural carbohydrates, or the like as additional ingredients, like conventional beverages. The above-described natural carbohydrates are monosaccharides such as glucose and sucrose, disaccharides such as maltose and sucrose, polysaccharides such as dextrin and cyclodextrin, and sugar alcohols such as xylitol, sorbitol, and erythritol. As a sweetener, a natural sweetener such as thaumatin or a *stevia* extract or a synthetic sweetener such as saccharin or aspartame may be used. The concentration of the natural carbohydrates is generally about 0.01 to 0.04 g and preferably about 0.02 to 0.03 g per 100 mL of the composition of the present invention.

In addition to the above, the food formulation may include various nutritional supplements, vitamins, electrolytes, flavoring agents, coloring agents, pectic acid and salts thereof, alginic acid and salts thereof, organic acids, protective colloidal thickeners, pH adjusting agents, stabilizers, preservatives, glycerin, alcohols, and carbonation agents used for carbonated beverages, and the like. In addition, the food formulation may include fruit flesh for preparing a natural fruit juice, a fruit juice drink, and a vegetable drink. Such ingredients may be used either alone or in combination. Although the concentration of such ingredients is not very important, it is generally selected within the range of 0.01 to 0.1 parts by weight based on 100 parts by weight of the composition of the present invention.

Yet another aspect of the present invention provides a method of achieving skin whitening, wrinkle improvement, elasticity enhancement, skin soothing, antiglycation, skin moisturization, or skin texture improvement, which includes a step of applying the *Lilium hansonii* extract to the skin.

Yet another aspect of the present invention provides a use of the *Lilium hansonii* extract for preparing a cosmetic composition for skin whitening, wrinkle improvement, elasticity enhancement, skin soothing, antiglycation, skin moisturization, or skin texture improvement.

Advantageous Effects

A *Lilium hansonii* extract of the present invention has a whitening effect by reducing the total amount of melanin and inhibiting the activity of tyrosinase, reduces wrinkles and enhances skin elasticity by promoting collagen synthesis by fibroblasts in the skin and inhibiting the activity of collagenase, has a skin soothing effect by reliving irritation and alleviating stinging, itchiness, hotness, and the like, inhibits glycation by having an antiglycation effect, has a skin moisturizing effect by promoting hyaluronic acid synthesis, and has a skin texture improvement effect by improving skin roughness. Therefore, the *Lilium hansonii* extract can be usefully used in the manufacture of cosmetics, pharmaceuticals, or foods.

DESCRIPTION OF DRAWINGS

FIG. 1 shows the results of a questionnaire for evaluating a degree of skin improvement after having 11 women in their 30s to 50s apply an essence containing a *Lilium hansonii* extract to their entire face twice a day for four weeks.

MODES OF THE INVENTION

Hereinafter, the present invention will be described in detail through Examples. However, the protection scope of the present invention is not limited by the Examples described below.

<Examples 1 to 3> Preparation of *Lilium hansonii* Extracts

The whole plant of *Lilium hansonii* (Example 1), roots thereof (Example 2), and flowers thereof (Example 3) were provided, and they were extracted at room temperature for three days by adding a 70% aqueous ethanol solution having a mass of 10 times their own mass and then filtered under reduced pressure. The filtered extracts were concentrated and dried using a rotary evaporator (Buchi, Switzerland) to obtain *Lilium hansonii* extracts.

<Comparative Examples 1 to 3> Preparation of *Lilium* Genus Plant Extracts

Whole plants of *Lilium candidum* (Comparative Example 1), *Lilium siberia* (Comparative Example 2), and *Lilium martagon* (Comparative Example 3) were extracted at room temperature for three days by adding a 70% aqueous ethanol solution having a mass of 10 times their own mass and then filtered under reduced pressure. The filtered extracts were concentrated and dried using a rotary evaporator (Buchi, Switzerland) to obtain respective extracts.

<Experimental Example 1> Confirmation of Skin Wrinkle Improvement and Elasticity Enhancement Effects 1) Effect of Increasing Total Collagen Amount The *Lilium hansonii* extracts and the three types of *Lilium* genus plant extracts were added to a culture medium containing human-derived fibroblasts, and then their effects of increasing a total collagen amount at the cellular level were compared.

The increased total collagen amount was quantified using a Procollagen Type I C-Peptide Enzyme ImmunoAssay kit (PICP EIA kit). Before testing, the cytotoxicity of the *Lilium hansonii* extracts prepared in Examples 1 to 3 and the *Lilium* genus plant extracts prepared in Comparative Examples 1 to 3 against human-derived fibroblasts was evaluated at various extract concentrations (μg/ml), and after selecting a concentration (100 μg/ml) not exhibiting cytotoxicity, a degree of increase in a total collagen amount was evaluated.

After adding each sample to a culture medium containing human-derived fibroblasts and culturing for one day, the culture medium was collected and a degree of increase in a total collagen amount at each concentration was measured at 450 nm using a PICP EIA kit and a spectrophotometer. For the comparison of effects, a degree of increase in a total collagen amount was measured in the same manner for a fibroblast culture medium to which no sample was added (control) and a sample to which vitamin C was added at a final concentration of 52.8 μg/ml. The total collagen amount was measured as UV absorbance, and a rate of increase in the total collagen amount was calculated as a ratio of a total collagen amount relative to that of the control, and the results are summarized in Table 1 below.

TABLE 1

| Sample | Collagen increase rate (%) |
|---|---|
| Control (no additive) | — |
| Vitamin C (52.8 µg/ml) | 26 |
| Example 1 (100 µg/ml) | 32 |
| Example 2 (100 µg/ml) | 35 |
| Example 3 (100 µg/ml) | 34 |
| Comparative Example 1 (100 µg/ml) | 19 |
| Comparative Example 2 (100 µg/ml) | 11 |
| Comparative Example 3 (100 µg/ml) | 13 |

*Total collagen amount increasing effect (number of repetitions = 3)

As can be seen from the results of Table 1, *Lilium hansonii* extracts have an excellent effect of increasing a total collagen amount by promoting collagen synthesis, and exhibited a total collagen amount increasing effect similar or superior to vitamin C and the *Lilium* genus plant extracts, which are known to be effective for increasing a total collagen amount, at the test concentrations.

2) Effect of Inhibiting Collagenase Activity

The collagenase activity inhibitory effects of the *Lilium hansonii* extracts or the three types of *Lilium* genus plant extracts were evaluated as follows.

Fibroblasts, which are normal human skin cells, were inoculated in a 24-well microplate so that there were 2.5× $10^4$ cells per well, and cultured in a 10% serum DMEM medium under the condition of 37° C. for 24 hours. Subsequently, the 10% serum DMEM medium was removed, and the fibroblasts were washed once with a phosphate buffer solution and then further cultured for 30 minutes in a serum-free DMEM medium supplemented with one of Examples 1 to 3 and Comparative Examples 1 to 3. In this case, as a control, fibroblasts were additionally cultured for 30 minutes in a serum-free DMEM medium without extracts.

30 minutes after sample treatment, fibroblasts were stimulated with 10 ng/ml of tumor necrosis factor-α (TNF-α), which is a material known to produce MMP-1, a collagenase, and cultured for 24 hours. In this case, among the controls not including the *Lilium hansonii* extract of the present invention, a TNF-α untreated control and a TNF-α treated control were used as a TNF-α untreated group and a TNF-α treated group, respectively.

After collecting supernatant from each well, the amount (ng/ml) of newly synthesized MMP-1 was measured using an MMP-1 assay kit (Amersham, USA), and a collagenase activity inhibition rate was determined by calculating an MMP-1 production inhibition rate (%) according to Mathematical Formula 1 below, and the results are shown in Table 2 below.

In the following Mathematical Formula 1, the amount of MMP-1 in the negative control refers to the amount of MMP-1 in the TNF-α untreated group, and the amount of MMP-1 in the positive control refers to the amount of MMP-1 in the TNF-α treated group, and the amount of MMP-1 in an experimental group refers to the amount of MMP-1 in a group in which one of Examples 1 to 3 and Comparative Examples 1 to 3 was added at each concentration.

[Mathematical Formula 1]

$$MMP-1 \text{ production inhibition rate } (\%) = \left(1 - \frac{X-Z}{Y-Z}\right) \times 100$$

($X = MMP-1$ amount in experimental group, $y = MMP-1$ in positive control, $Z = MMP-1$ amount in negative control)

TABLE 2

| Sample | Inhibition rate (%) |
|---|---|
| Negative control (TNF-α untreated) | — |
| Positive control (TNF-α treated) | — |
| Example 1 (100 µg/ml) | 75.5 |
| Example 2 (100 µg/ml) | 80.4 |
| Example 3 (100 µg/ml) | 82.1 |
| Comparative Example 1 (100 µg/ml) | 44.3 |
| Comparative Example 2 (100 µg/ml) | 36.1 |
| Comparative Example 3 (100 µg/ml) | 26.0 |

*Collagenase activity inhibitory effect (number of repetitions = 3)

Referring to the results of Table 2, when Examples 1 to 3 and Comparative Examples 1 to 3 were evaluated, it can be seen that the *Lilium hansonii* extracts were about two to three times more effective in inhibiting MMP-1, which is a collagenase, than the *Lilium* genus plant extracts of the same concentration.

<Experimental Example 2> Confirmation of Skin Whitening Effect

1) Effect of Inhibiting Tyrosinase

A tyrosinase enzyme extracted from mushrooms and commercially available from SIGMA was used. First, tyrosine, a substrate, was dissolved in distilled water to make a solution having a concentration of 0.3 mg/ml, 1.0 ml of the solution was input into each test tube, and 1.0 ml of a potassium-phosphate buffer solution (concentration: 0.1 mol, pH: 6.8) and 0.7 ml of distilled water were added thereto. 0.2 ml of a sample solution, which had been prepared by adding one of Examples 1 to 3 of the present invention and Comparative Examples 1 to 3 to an ethanol solution at a final concentration of 100 µg/ml, was added to a reaction solution and then reacted in a 37° C. thermostat for 10 minutes. In this case, a control was prepared by adding only 0.2 ml of an ethanol solution instead of the sample solution, and vitamin C was used as a positive control. After adding 0.1 ml of a 2,500 units/ml tyrosinase solution, the reaction solution was again reacted in a 37° C. thermostat for 10 minutes. The test tube containing the reaction solution was quenched by placing in ice water to stop the reaction, and absorbance was measured at a wavelength of 475 nm using a photoelectric spectrometer, and the results are shown in Table 3 below. The tyrosinase inhibitory effect of each sample was calculated according to the following Mathematical Formula 2.

[Mathematical Formula 2]

$$\text{Tyrosinase inhibition rate } (\%) = 100 - \left(\frac{\text{Reaction absorbance of sample}}{\text{Reaction absorbance of control}} \times 100\right)$$

TABLE 3

| Sample | Tyrosinase inhibition rate (%) |
|---|---|
| Control (no additive) | 0 |
| Vitamin C (52.8 μg/ml) | 50 |
| Example 1 (100 μg/ml) | 59 |
| Example 2 (100 μg/ml) | 60 |
| Example 3 (100 μg/ml) | 58 |
| Comparative Example 1 (100 μg/ml) | 25 |
| Comparative Example 2 (100 μg/ml) | 34 |
| Comparative Example 3 (100 μg/ml) | 33 |

*Tyrosinase inhibitory effect (number of repetitions = 3)

Referring to Table 3, it can be confirmed that the *Lilium hansonii* extracts had a tyrosinase inhibitory effect, and in particular, at a concentration of 100 sg/ml, Examples 1 to 3 had a higher inhibitory effect than ascorbic acid (vitamin C) known as a tyrosinase inhibitor, so an excellent whitening effect was exhibited.

2) Confirmation of Effect of Reducing Total Melanin Amount

Each of Examples 1 to 3 and Comparative Examples 1 to 3 was added to a mouse melanoma cell (B-16 mouse melanoma cell) culture medium, and a whitening effect thereof at the cellular level was tested.

Each extract was tested after being added to the culture medium at a final concentration of 100 μg/ml, and arbutin, which was a control, was added to the medium at a concentration of 100 μg/ml. B-16 melanoma cells were treated with the experimental group or the control and then cultured for three days.

Subsequently, the cultured cells were treated with trypsin, removed from the culture vessel, and then centrifuged to extract melanin. The removed cells were treated with 1 ml of a sodium hydroxide solution (1 N) and then boiled for 10 minutes to dissolve melanin, and absorbance was measured at 400 nm using a spectrophotometer to measure the amount of produced melanin.

The amount of melanin was measured as absorbance per unit cell number ($10^6$ cells), and a ratio thereof relative to the total melanin amount of the control was calculated as an inhibition rate (%), and the results are summarized in Table 4.

TABLE 4

| Sample | Total melanin amount (Abs) | Inhibition rate (%) |
|---|---|---|
| Control (no additive) | 0.254 | — |
| Arbutin (100 μg/ml) | 0.126 | 50.4 |
| Example 1 (100 μg/ml) | 0.113 | 55.5 |
| Example 2 (100 μg/ml) | 0.112 | 55.9 |
| Example 3 (100 μg/ml) | 0.125 | 50.8 |
| Comparative Example 1 (100 μg/ml) | 0.199 | 21.7 |
| Comparative Example 2 (100 μg/ml) | 0.177 | 30.3 |
| Comparative Example 3 (100 μg/ml) | 0.217 | 14.6 |

*Total melanin amount reduction effect (number of repetitions = 3)

Referring to the results of the above Table 4, it can be confirmed that all Examples related to a *Lilium hansonii* extract had a whitening effect. In particular, it can be seen that Examples 1 to 3 had a superior melanin inhibitory effect as compared to arbutin, which is known to be effective for whitening, of the same concentration and were also twice or more effective than the *Lilium* genus plant extracts of Comparative Examples.

<Experimental Example 3> Confirmation of Skin Moisturizing Effect (1)

1) Confirmation of Effect of Promoting Hyaluronic Acid Synthesis

Human dermal fibroblasts were cultured at a concentration of $1\times10^5$ cells/mL in a DMEM medium containing 10% fetal bovine serum and, after dispensing 500 μl thereof into each well of a 24-well plate, cultured for 18 hours. Subsequently, each sample was diluted in a DMEM medium not containing fetal bovine serum, and each sample was added at various concentrations. As a positive control, an epidermal growth factor (EGF) known to promote hyaluronic acid production was treated at a concentration of 10 ppb. After culturing for 24 hours, a cell culture medium was recovered, and the concentration of hyaluronic acid was measured using a Hyaluronan ELISA kit (R&D Systems).

In addition, the hyaluronic acid concentration of each experimental group treated with each sample was quantified based on the hyaluronic acid concentration (100%) of a control not containing an additive, and the results are shown in the following Table 5.

TABLE 5

| Sample | Hyaluronic acid (%) |
|---|---|
| No additive (control) | 100 |
| EGF 10 ng/ml (10 ppb) (positive control) | 150.9 |
| Example 1 (100 μg/ml) | 170.3 |
| Example 2 (100 μg/ml) | 190.8 |
| Example 3 (100 μg/ml) | 160.5 |
| Comparative Example 1 (100 μg/ml) | 108.9 |
| Comparative Example 2 (100 μg/ml) | 116.7 |
| Comparative Example 3 (100 μg/ml) | 114.2 |

*Hyaluronic acid synthesis promoting effect (number of repetitions = 3)

Referring to the above Table 5, it can be confirmed that the synthesis of hyaluronic acid was increased in all Examples related to a *Lilium hansonii* extract. In particular, in the case of Examples 1 to 3, higher concentrations and superior efficacy as compared to the case of the positive control were exhibited, and it can be seen that the effect was excellent as compared to the case of Comparative Examples, which are extracts of other *Lilium* genus plants.

<Preparation Example 1> Manufacture of Essence Including *Lilium hansonii* Extract To confirm the skin improvement effect of the *Lilium hansonii* extracts prepared in the above Examples 1 to 3, essences were manufactured according to compositions of the following Table 6.

TABLE 6

| Ingredient (parts by weight) | A | B | C | D |
|---|---|---|---|---|
| *Lilium hansonii* extract | 2 (Example 1) | 2 (Example 2) | 2 (Example 3) | 0 |
| Purified water | To 100 | To 100 | To 100 | To 100 |
| Ethanol | 10 | 10 | 10 | 10 |

TABLE 6-continued

| Ingredient (parts by weight) | A | B | C | D |
|---|---|---|---|---|
| Hexanediol | 2 | 2 | 2 | 2 |
| Glycerin | 1 | 1 | 1 | 1 |
| PEG-150 | 1 | 1 | 1 | 1 |
| Dipropylene glycol | 1 | 1 | 1 | 1 |
| Glycereth-26 | 1 | 1 | 1 | 1 |
| Sodium hyaluronate | 4 | 4 | 4 | 4 |
| PEG-8 | 4 | 4 | 4 | 4 |
| Sodium citrate | 1 | 1 | 1 | 1 |
| Citric acid | 0.5 | 0.5 | 0.5 | 0.5 |
| Fragrance | 0.5 | 0.5 | 0.5 | 0.5 |
| Total | 100 | 100 | 100 | 100 |

<Experimental Example 4> Confirmation of Skin Moisturizing Effect (2)

1) Change in Skin Moisture Content Before and After Using Essence

To test a skin moisturizing effect, skin evaluation was performed while using the essences manufactured in the above Preparation Example 1. As the evaluation subjects, 20 women in their 30s and 40s were randomly divided into five people per group, and each group was asked to apply one of essences A to D to their entire face, and two weeks later, the moisture content of the skin was measured. Specifically, the 20 subjects were asked to wash their faces with soap, and then their skin was acclimatized to constant temperature and humidity conditions (temperature: 20±2° C., relative humidity: 40±2%). Using a corneometer (CM825), the capacitance of the skin surface was repeatedly measured three times. The average results are shown in Table 7.

TABLE 7

|  | Rate of change in moisture content after two weeks (%) |
|---|---|
| A | 23 |
| B | 30 |
| C | 28 |
| D | 7 |

*Change in skin moisture content

Referring to the above Table 7, when essences (A to C) containing a *Lilium hansonii* extract were used for two weeks, the moisture content of the skin surface was significantly higher than in the case of the control (D). Therefore, it can be seen that a *Lilium hansonii* extract has an excellent moisturizing effect.

<Experimental Example 5> Confirmation of Skin Texture Improvement Effect

1) Confirmation of Skin Texture Improvement Effect on Human Skin

A sensory evaluation was performed to confirm the skin texture improvement effect of the essences manufactured in Preparation Example 1. After recruiting 40 women in their 30s to 50s, 10 subjects were randomly selected and asked to apply one of the essences A to D to their entire face twice a day for four weeks. After four weeks of use, a degree of improvement in skin roughness was scored on a scale of 1 to 10 to compare skin texture improvement effects. Here, scores close to 1 represent a low skin texture improvement effect, and scores close to 10 represent an excellent skin texture improvement effect. An average score for each essence is shown in the following Table 8.

TABLE 8

|  | Skin texture improvement effect (out of 10) |
|---|---|
| A | 7.8 |
| B | 8.0 |
| C | 8.2 |
| D | 6.5 |

Referring to Table 8, it can be seen that the skin texture improvement effect is greater when an essence (A, B, or C) including a *Lilium hansonii* extract is used rather than when an essence (D) not including a *Lilium hansonii* extract is used.

2) Questionnaire Evaluation of Degree of Skin Improvement

A questionnaire evaluation was performed to confirm a skin improvement effect of essence A of the above-described Preparation Example 1. 11 women in their 30s to 50s were asked to apply A to their entire face twice a day for four weeks. After four weeks of use, a questionnaire was filled out to evaluate a degree of skin improvement, and the results are shown in FIG. 1. FIG. 1 shows the percentage of subjects who responded "yes" or "strongly yes."

Referring to FIG. 1, it can be seen that 70% or more of users who used essence A of Preparation Example 1 including a *Lilium hansonii* extract experienced an excellent skin texture improvement effect.

<Experimental Example 6> Confirmation of Antiglycation Effect

To confirm an antiglycation efficacy, glycation inhibitory activity was measured using L-arginine and glucose.

A solution of 1 M L-arginine and 1 M glucose in 1 M phosphate buffer (pH 7.4) was first prepared and diluted with 1 M phosphate buffer so that the concentration of the sample was 100 μg/ml, 1 M L-arginine and 1 M phosphate buffer were mixed in a ratio of 1:4, and 80 μl thereof was dispensed into each well of a 96-well plate. To this, each sample, which was diluted to 100 μg/ml, and 100 μl of 0.01 M aminoguanidine, which was used as a positive control, were added. After sufficiently mixing the sample, finally, glucose which was diluted with 1 M phosphate buffer so that the final concentration of glucose was 0.1 M was added and then reacted at 70° C. for four hours. In the 96-well plate, absorbance was measured at 420 nm using a spectrophotometer to measure a degree of glycation.

The glycation experimental group of Mathematical Formula 3 is an experimental group in which glycation was induced by adding 1 M L-arginine and 1 M glucose, and to measure the absorbance of a sample itself, absorbance was measured at 420 nm after adding only 1 M L-arginine and the sample and no glucose.

The glycation inhibitory activity can be calculated according to the following Mathematical Formula 3. Each group was tested three times, and an average value was obtained.

[Mathematical Formula 3]

$$\text{Glycation inhibition rate (\%)} = \frac{\left(\begin{array}{c}\text{Absorbance of sample after reaction} - \\ \text{Absorbance of sample before reaction}\end{array}\right)}{\text{Glycation experimental group}} * 100$$

TABLE 9

| Sample | Glycation inhibition rate (%) |
| --- | --- |
| Control (DMSO, 50 µg/ml) | — |
| Positive control (Aminoguanidine, 55 µg/ml) | 54.89 |
| Example 1 (50 µg/ml) | 48.24 |
| Example 2 (50 µg/ml) | 40.55 |
| Example 3 (50 µg/ml) | 50.18 |
| Comparative Example 1 (50 µg/ml) | 21.35 |
| Comparative Example 2 (50 µg/ml) | 11.83 |
| Comparative Example 3 (50 µg/ml) | 17.22 |

*Glycation inhibitor effect (number of repetitions = 3)

Referring to the above Table 9, it can be confirmed that all Examples related to a *Lilium hansonii* extract had an antiglycation effect, and when compared to aminoguanidine known as an antiglycation material, the antiglycation effect was similar to that of aminoguanidine. Therefore, it can be expected that skin troubles caused by a final glycation product will be improved by the excellent antiglycation effect of a *Lilium hansonii* extract.

<Experimental Example 7> Confirmation of Skin Soothing Effect

1) Confirmation of Irritation Relieving Effect

To confirm an irritation relieving effect of a *Lilium hansonii* extract, an effect of inhibiting prostaglandin E2 (PGE2), which is a material related to irritation, was evaluated.

First, to quantify PGE2, a RAW 264.7 mouse macrophage cell line (KCLB no 40071, Korean Cell Line Bank, Seoul, Korea) was purchased, and 100 µl was dispensed into each well of a 96-well microplate at a cell inoculation concentration of 2.5×10⁶ cells/ml. As a medium, DMEM (Gibco-BRL, Grand Island, NY, USA) supplemented with 10% FBS (GibcoBRL, Grand Island, NY, USA) and 1% penicillin/streptomycin (Thermo Scientific Hyclone, Waltham, MA, USA) was used, and culture was carried out under the conditions of 5% $CO_2$ and 37° C. In the cell culture medium in which the above-described RAW 264.7 cells had been dispensed, 1 µg/ml of lipopolysaccharide (LPS) (Sigma, St. Louis, MO, US) was treated to induce irritation, and one of Examples 1 to 3 and Comparative Examples 1 to 3 was treated. Subsequently, the cells were cultured for 24 hours, centrifuged at 900 rpm and 4° C. for five minutes, and then the cell culture medium was recovered to measure the amount of PGE2 produced in the culture medium. The PGE2 was quantified using a commercially available PGE2 ELISA kit (MyBioSource Co., Ltd., San Diego, CA, USA), according to the manufacturer's instructions.

TABLE 10

| Sample | PGE2 production amount (pg/mL) | PGE2 inhibition rate (%) |
| --- | --- | --- |
| Untreated | 323 | — |
| Example 1 (50 µg/ml) | 165 | 48.9 |
| Example 2 (50 µg/ml) | 157 | 51.4 |
| Example 3 (50 µg/ml) | 161 | 50.2 |
| Comparative Example 1 (50 µg/ml) | 205 | 36.5 |
| Comparative Example 2 (50 µg/ml) | 211 | 34.7 |
| Comparative Example 3 (50 µg/ml) | 228 | 29.4 |

*Skin irritation relief effect (number of repetitions = 3)

As a result, it can be seen that all of Examples 1 to 3 related to a *Lilium hansonii* extract had an effect of reducing PGE2 production. That is, it was confirmed that a *Lilium hansonii* extract had the ability to alleviate skin irritation through having the effect of inhibiting PGE2 production.

2) Confirmation of Stinging, Itchiness, and Hotness Soothing Effect

To confirm the skin soothing effect of a *Lilium hansonii* extract, irritation was induced, and then whether stinging, itchiness, or hotness was relieved was evaluated.

A chamber containing a 0.2% aqueous sodium laureth sulfate (SLES) solution was first attached to the arms of 15 healthy adult males and 15 healthy adult females, and after eight hours had elapsed, the Finn chamber was removed, and the subjects were asked to evaluate the stinging, itchiness, and hotness they experienced based on the criteria shown in the following table. The evaluation criteria are shown in the following Table 11.

<Skin Soothing Effect Evaluation Criteria>

TABLE 11

| Score | Criteria |
| --- | --- |
| 1 | No irritation |
| 2 | Very little irritation |
| 3 | Distinct irritation |
| 4 | Strong irritation |
| 5 | Very strong irritation to the extent of causing pain |

Subsequently, the subjects were asked to apply a randomly chosen one of the previously produced essences A to D once a day (at 9 am) for three days to the skin area where SLES had been applied and then evaluate the stinging, itchiness, and hotness they were experiencing. The results are as follows.

TABLE 12

Evaluation item: Stinging

|   | Day 0 | Day 1 | Day 2 | Day 3 |
|---|---|---|---|---|
| A | 4.2 | 2.0 | 1.4 | 1.2 |
| B |  | 2.0 | 1.8 | 1.6 |
| C |  | 2.0 | 1.6 | 1.6 |
| D |  | 3.6 | 3.6 | 3.0 |

TABLE 13

Evaluation item: Itchiness

|   | Day 0 | Day 1 | Day 2 | Day 3 |
|---|---|---|---|---|
| A | 4.6 | 2.2 | 1.6 | 1.2 |
| B |  | 2.0 | 1.4 | 1.4 |
| C |  | 2.0 | 1.8 | 1.6 |
| D |  | 4.0 | 3.8 | 3.6 |

TABLE 14

Evaluation item: Hotness

|   | Day 0 | Day 1 | Day 2 | Day 3 |
|---|---|---|---|---|
| A | 3.0 | 1.2 | 1.0 | 1.0 |
| B |  | 1.6 | 1.4 | 1.0 |
| C |  | 1.4 | 1.4 | 1.2 |
| D |  | 2.8 | 2.4 | 2.0 |

Referring to the above Tables 12 to 14, it can be seen that after using essences A to C including a *Lilium hansonii* extract, the degree of stinging, itchiness, and hotness was greatly reduced. On the other hand, in the case of essence D not including a *Lilium hansonii* extract, it can be seen that the difference between day 0 and day 3 was insignificant.

The invention claimed is:

1. A method of treating a skin condition in a subject in order to reduce a total amount of melanin in the skin, promote collagen synthesis by fibroblasts in the skin, improve wrinkles by inhibiting collagenase activity, increase elasticity, soothe skin, inhibit glycation by having an antiglycation effect moisturize skin by promoting hyaluronic acid synthesis, or improve skin texture by reducing skin roughness, the method comprising:

applying a composition comprising a *Lilium hansonii* extract as an active ingredient in an amount effective to reduce the total amount of melanin in the skin, promote collagen synthesis by fibroblasts in the skin, improve wrinkles by inhibiting collagenase activity, increase elasticity, soothe skin, inhibit glycation by having the antiglycation effect, moisturize skin by promoting hyaluronic acid synthesis, or improve skin texture by reducing skin roughness, wherein the *Lilium hansonii* extract is an extract obtained by extracting *Lilium hansonii* with a combination of water and ethanol, and wherein the *Lilium hansonii* extract is included in an amount of 0.0001 parts by weight to 10 parts by weight based on 100 parts by weight of the composition.

2. A method of treating a skin condition in a subject in order to reduce a total amount of melanin in the skin, promote collagen synthesis by fibroblasts in the skin, improve wrinkles by inhibiting collagenase activity, increase elasticity, soothe skin, inhibit glycation by having an antiglycation effect moisturize skin by promoting hyaluronic acid synthesis, or improve skin texture by reducing skin roughness, the method comprising:

administering a composition comprising a *Lilium hansonii* extract as an active ingredient in an amount effective to reduce the total amount of melanin in the skin, promote collagen synthesis by fibroblasts in the skin, improve wrinkles by inhibiting collagenase activity, increase elasticity, soothe skin, inhibit glycation by having the antiglycation effect, moisturize skin by promoting hyaluronic acid synthesis, or improve skin texture by reducing skin roughness, wherein the *Lilium hansonii* extract is an extract obtained by extracting *Lilium hansonii* with combination of water and ethanol, and wherein the *Lilium hansonii* extract is included in an amount of 0.0001 parts by weight to 10 parts by weight based on 100 parts by weight of the composition.

3. The method according to claim 1, wherein the composition comprises a cosmetic carrier selected from the group consisting of a lotion, an emulsion, a cream, and an essence.

4. The method according to claim 2, wherein the composition comprises a pharmaceutically acceptable carrier selected from the group consisting of a solution, a suspension, or an emulsion in an oil medium, an extract, a powder, a granule, a tablet, and a capsule.

* * * * *